United States Patent
Ward, Jr.

(10) Patent No.: US 6,789,422 B1
(45) Date of Patent: Sep. 14, 2004

(54) METHOD AND SYSTEM FOR BALANCING A ROTATING MACHINERY OPERATING AT RESONANCE

(75) Inventor: Talmadge D. Ward, Jr., Paducah, KY (US)

(73) Assignee: United States Enrichment Corporation, Bethesda, MD (US)

( * ) Notice: Subject to any disclaimer, the term of this patent is extended or adjusted under 35 U.S.C. 154(b) by 0 days.

(21) Appl. No.: 10/032,384

(22) Filed: Dec. 21, 2001

(51) Int. Cl.$^7$ .......................... G01M 1/22; G01M 1/16
(52) U.S. Cl. ........................... 73/462; 73/460; 73/468
(58) Field of Search ........................... 73/460, 462, 468

(56) References Cited

U.S. PATENT DOCUMENTS

| | | | |
|---|---|---|---|
| 4,098,127 A | | 7/1978 | Shiga et al. |
| 4,238,960 A | * | 12/1980 | Curtis et al. .................. 73/462 |
| 4,435,770 A | | 3/1984 | Shiohata et al. |
| 4,453,407 A | | 6/1984 | Sato et al. |
| 4,485,678 A | * | 12/1984 | Fanuele ....................... 73/660 |
| 4,489,606 A | | 12/1984 | Shiohata et al. |
| 5,130,589 A | | 7/1992 | Kanemitsu |
| 5,172,325 A | * | 12/1992 | Heidari ...................... 701/124 |
| 5,214,585 A | * | 5/1993 | Ehrich ......................... 73/462 |
| 5,408,875 A | * | 4/1995 | Matsushita et al. ........... 73/462 |
| 5,421,199 A | | 6/1995 | Himmler |
| 5,544,073 A | * | 8/1996 | Piety et al. .................. 700/279 |
| 5,724,271 A | * | 3/1998 | Bankert et al. ............... 73/462 |

* cited by examiner

*Primary Examiner*—Hezron Williams
*Assistant Examiner*—John Hanley
(74) *Attorney, Agent, or Firm*—Townsend & Townsend & Crew LLP (57) ABSTRACT

A method and system for balancing a rotating machinery that operates at or near resonance during its normal operating speed, and which has three separate shafts whose axes of rotations are not aligned along a common axis of rotation and counterweights connected near the ends of each of the shafts. The method includes obtaining speed and vibration data, by mounting velocity transducers on the machine's inner frame and outer casing. A data acquisition system is used to collect and analyze the speed and vibration data for steady state and transient operations. The method further includes adjusting the counterweights using a predetermined rotor influence coefficient determined experimentally using the same setup of transducers, to reduce vibrations below an acceptable level. The data is collected from measurement locations where the number and positions of the measurement locations are less than and different from the number and locations of the correction planes.

21 Claims, 5 Drawing Sheets

METHOD AND SYSTEM FOR BALANCING A ROTATING MACHINERY OPERATING AT RESONANCE

BACKGROUND OF THE INVENTION

The present invention is related to the balancing of rotating machinery, and particularly to methods and systems for the balancing of rotating machinery which operate at or near resonance at their normal operational speed.

Rotating machinery are balanced to reduce vibration levels to levels that are acceptable from an operational and safety viewpoint. One cause of machinery vibration is imbalance. Imbalance produces centrifugal forces that adversely load bearings, which in turn reduces the operational life of the bearings, which reduces the expected life of the rotating machinery. Rolling element bearings are especially vulnerable to unbalance loads. The average cost of a bearing replacement for a critical rotating machinery can be in excess of tens of thousand of dollars. Besides bearings, other equipment as well as those connected to rotating machinery may also be damaged by the unacceptable machinery vibration levels, which also add to the costs associated with the remediation of the vibration levels.

The need for the balancing of rotating machinery to reduce or eliminate vibration levels has been recognized for many years and many methods have been developed to address the need. On one hand, there are purely heuristic methods that can take from several days to more than a week to complete. On the other hand, there are more deterministic methods that include a vibration analysis of the rotating machinery to determine the vibration vector(s) which provides a magnitude of the amplitude and phase of the vibration. Phase as used herein relates to the angular position of the vibration high point on a rotating shaft, which is measured with respect to a known reference point. One such deterministic method is commonly known as the Rotor Influence Coefficient ("RIC") method. The output of a RIC test provides an influence coefficient, which is a measure of the amount and location (phase) of the necessary correction weights that needs to be added to or removed from a rotating shaft to lower a measured vibration below an acceptable threshold. Armed with the results of a vibration analysis (e.g., influence coefficients), operating personnel will have the ability to achieve future one-shot balancing of that or any other similar machine. This method (RIC) affords a highly accurate and short duration process to balance other similar rotating machinery as opposed to a heuristic, uncertain and time consuming process.

As the number of rotating shafts increase in a rotating machinery from one to several shafts, dynamic vibration analysis and balancing methods based thereon get more complicated and their data analysis needs get rather more unruly. For example, each shaft will need its own set of vibration transducers, in addition to casing-mounted transducers, all of which increases the complexity and cost of the balancing task.

Furthermore, industry practice guidelines related to the balancing of rotating machinery specifically recommend that a vibration analysis and the related balancing not be done near resonance conditions as the location of maximum vibration amplitude on a rotating shaft (phase) changes very rapidly with speed near resonance and can lead to considerable measurement error and/or equipment damage. While most rotating machinery are designed to not operate at rotational speeds that are near the resonance conditions, some machines operate near resonance conditions at their normal (1X) operational speed.

There is therefore a need for methods and systems for performing a dynamic vibration analysis and balancing of multi-rotor rotating machinery and especially multi-rotor machinery which operate operating at or near structural resonance conditions.

BRIEF SUMMARY OF THE INVENTION

The present invention provides a method and system for balancing a rotating machinery, wherein the rotating machinery has an inner frame, an outer casing, and counterweights connected with a shaft of the rotating machinery, comprising: mounting a proximity probe on the outer casing, the proximity probe configured to provide phase readings to a phase reading output channel, wherein the phase reading is measured in degrees measured with respect to a key phasor; mounting a first plurality of velocity transducers on the inner frame, each of the velocity transducers configured to provide a first plurality of velocity signals to a first plurality of velocity signal output channels; mounting a second plurality of velocity transducers on the outer casing, each of the velocity transducers configured to provide a second plurality of velocity signals to a second plurality of velocity signal output channels; connecting the phase reading output channel, the first and second plurality of velocity signal output channels to a data acquisition system; collecting vibration data provided by the phase reading output channel, and the first and second plurality of velocity signal channels, using the data acquisition system; removing the outer casing to allow access to the counterweights; and adjusting the counterweights using a predetermined rotor influence coefficient to reduce the vibration below an acceptable threshold level.

For a further understanding of the nature and advantages of the invention, reference should be made to the following description taken in conjunction with the accompanying drawings.

DETAILED DESCRIPTION OF THE INVENTION

Overall Approach

Embodiments of the method of the present invention are related to the balancing of turbomachinery that operate at or near resonant conditions at their normal operating speed. The method most commonly used is known by various names the "three run" method, the "trial weight" method, the Thearle method, the "Rotor Influence Coefficient" method, etc. and others as are known to those skilled in the art. The teachings provided from the accepted industry practice prohibit the balancing of a machine in or near resonance condition, and guide an operator to first modify the machine out of a resonance condition before attempting to balance a machine. These teachings are quite valuable from a design perspective, because they force the machine designers to avoid designing a machine that has an operational mode near a resonance condition. However, these teachings are not very effective for an operator faced with the task of balancing a machine that operates, by design, near a resonance condition. The inventor of the present invention provides methods and systems, based on a RIC approach, that enable the balancing of machines that, by design, operate near resonance conditions.

Resonance, Machinery Design and Balancing

Resonance or structural resonance is defined as a condition where a machine operates at the (or harmonics of) natural frequency of the rotor or structure. Resonance amplifies the exciting force and may be such a destructive condition that most, if not all rotating machines, are designed to operate well above or below any resonant conditions. As machinery speed increases approaching a resonance condition, the mechanical phase lag between the heavy spot of unbalance and the high spot of vibration increases. At speeds well below resonance speeds, the heavy spot of unbalance and the high spot of vibration are at the same place on a rotating shaft, or in other words, the mechanical phase difference is nearly zero. However, as the machine's operational speed increases approaching a resonance speed, the phase difference continues to increase to a phase difference approaching 90 degrees. At this point (phase difference of approximately 90 degrees) the machinery is considered to be operating in resonance, wherein the forces and vibrations are amplified and the machine is at risk of failure.

Not only are machines generally designed to avoid running speeds near the resonant speed of the machine, accepted industry practice also extends this prohibition to vibration analysis and dynamic balancing procedures. One reason for this accepted practice is that an inadvertent weight adjustment and hence an inadvertent increase in unbalance could prove to be at best unsafe and at worst disastrous.

Vibration Analysis

A goal of vibration analysis is to characterize the vibration signature of a machine and reduce the vibration levels to acceptable levels. A major contributor to vibration levels is rotor imbalance, which includes the eccentric relative placement of the distributed rotor mass with respect to the shaft's center of rotation. Unbalance problems are generally indicated by a higher-than-acceptable vibration amplitude at the running speed (or "1X") speed. Further, it is known that in addition to a residual imbalance of a rotor, vibration is also most typically produced by bearing defects, meshing of gears and many other sources as is known by those of skill in art of maintaining rotating machinery.

Vibration analysis and in-field-balancing generally require the measurement of various vibration vectors, wherein each vibration vector may be defined by a vibration amplitude and a phase angle, or other equivalent readings. The measurement of vibration vectors is generally achieved by using appropriate motion transducers, which include, displacement, velocity and acceleration transducers. Those having necessary skills to be involved in the vibration analysis of turbomachinery are quite familiar with the various types of transducers, their advantages and limitations. For the purpose of the embodiments of the present invention, a detailed description of the specific types of transducer, their selection and mounting is not provided herein, as such knowledge is well within the scope of knowledge possessed by one of ordinary skill in the art. It is generally known that frequency considerations are important in selecting and monitoring a vibration parameter (e.g., acceleration, velocity and displacement). For example, acceleration is not a good choice for very low frequency analysis, while displacement does not generally work well for high frequencies. Furthermore, it is generally known that velocity is a good indicator of damage, independent of machine speed, implying that that vibration velocity is a good parameter for general machine monitoring. Therefore, embodiments of the present invention use a combination of velocity and displacement transducers which are adequate for the particular vibration analysis task involved. This selection of transducer types is meant to be illustrative and not limiting of the scope of the present claimed invention.

In addition to using motion transducers for measuring vibration parameters, the operating speed of the shaft also needs to be monitored as a part of the vibration measurements. Transducers used for the purpose of measuring the operating speed of a shaft are called tachometers. Tachometers normally produce a fixed number of "pulses" per revolution which is in turn converted to a rotational speed by a counter, e.g., a data acquisition system. Common types of tachometers include the displacement probe, optical sensors, or magnetic sensors. Another transducer used as a tachometer is a proximity probe. A proximity probe is a non-contacting displacement transducer which is used to measure relative shaft motion. Proximity probes, when used as a tachometer, are useful in determining accurate operating speeds of a shaft and identifying speed-related components of velocity. The transducer itself normally provides a pulse of some fixed amplitude at a rate related to the rotational speed, wherein the pulse is typically provided once per revolution.

A proximity probe when used as a tachometer, is not used to get accurate displacement information, but is primarily used to detect the presence of a key way slot on a rotating shaft. This key way slot which is detected by a proximity probe is referred to as a keyphasor. It is known that the use of the keyphasor tachometer signal provides highly reliable results as compared to other methods for measuring a phase reference angle; such as for example, the stroboscopic technique for measuring a phase angle. Thus, a proximity probe when used as a tachometer to detect a shaft key way (keyphasor) provides a once per revolution signal to a data acquisition system. The output of the proximity probe (tachometer) is handled in one of two ways. The proximity probes output is fed into a channel of the data analyzer where the once-per-revolution pulse train will produce a large frequency component at the rotation speed of the shaft. This signal is useful in obtaining phase information about all the other response channels (i.e., velocity transducers). Alternately, the output signal of the proximity probe is used to measure the rotational speed of the shaft. Additionally, the output signal of the proximity probe is connected to trigger the input of the data analyzer to obtain a phase reference. Thus, the keyphasor and its detection by the proximity probe provide a means of getting a consistent trigger signal from a rotating shaft. Furthermore, as vibration data is typically provided as a vector with a magnitude and a phase angle, the key phasor serves as a reference with respect to which the phase angle is measured. Therefore, a keyphasor is used to measure a beginning of a rotation and a reference for angle computations, and the proximity probe in conjunction with the keyphasor is used to provide phase as well as rotational speed information. Thus, a vibration analysis provides for the measurement of vibration vectors using various transducers and tachometers, wherein each vector includes a vibration magnitude (e.g., mils or inches) and a phase angle (degrees measured relative to a key way or a keyphasor).

Rotor Dynamics

Figure 1:
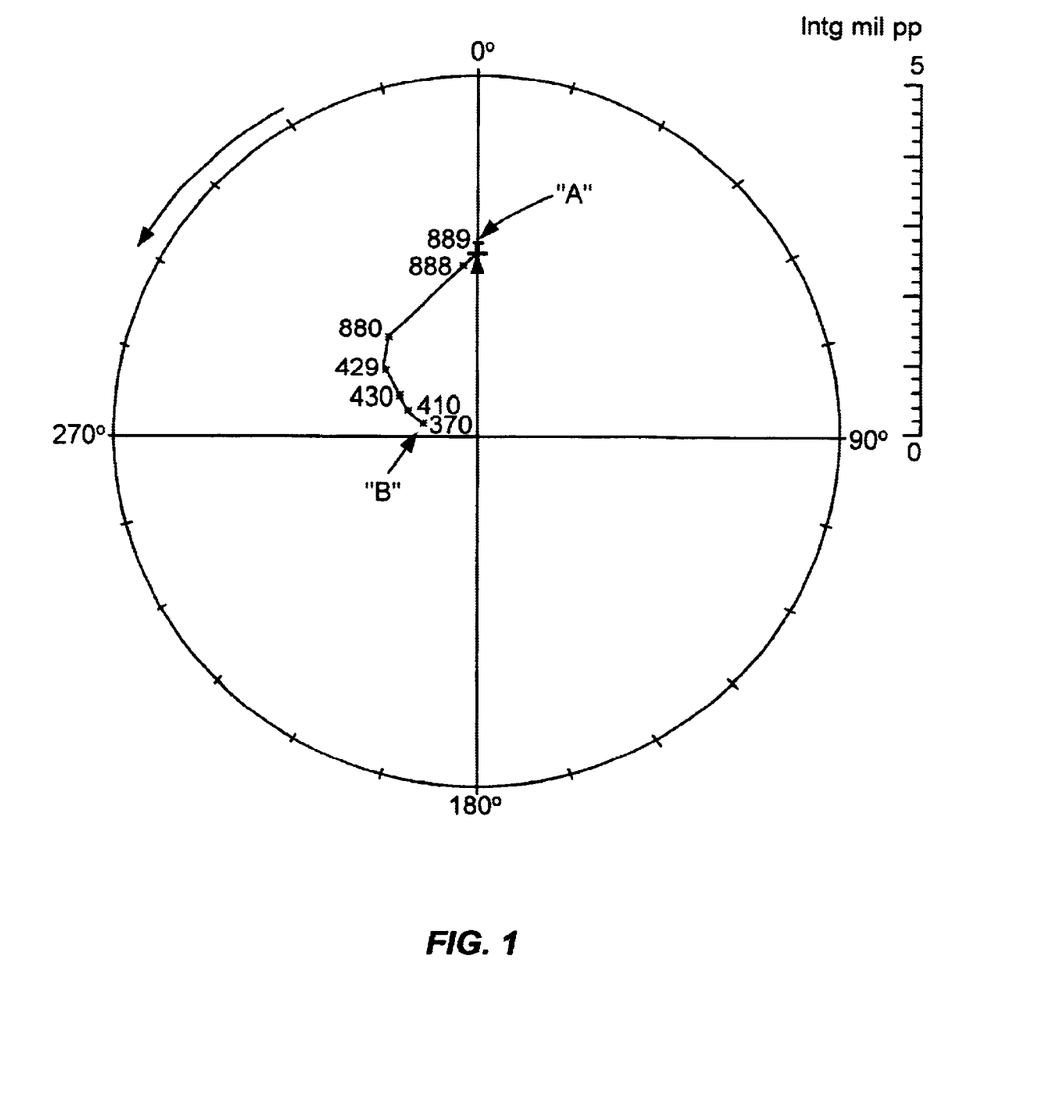
FIG. 1 is polar graph of a vibration data from a velocity transducer oriented at the keyphasor from a three-shaft scroll pump before the application of resonance balancing.
Figure 2:
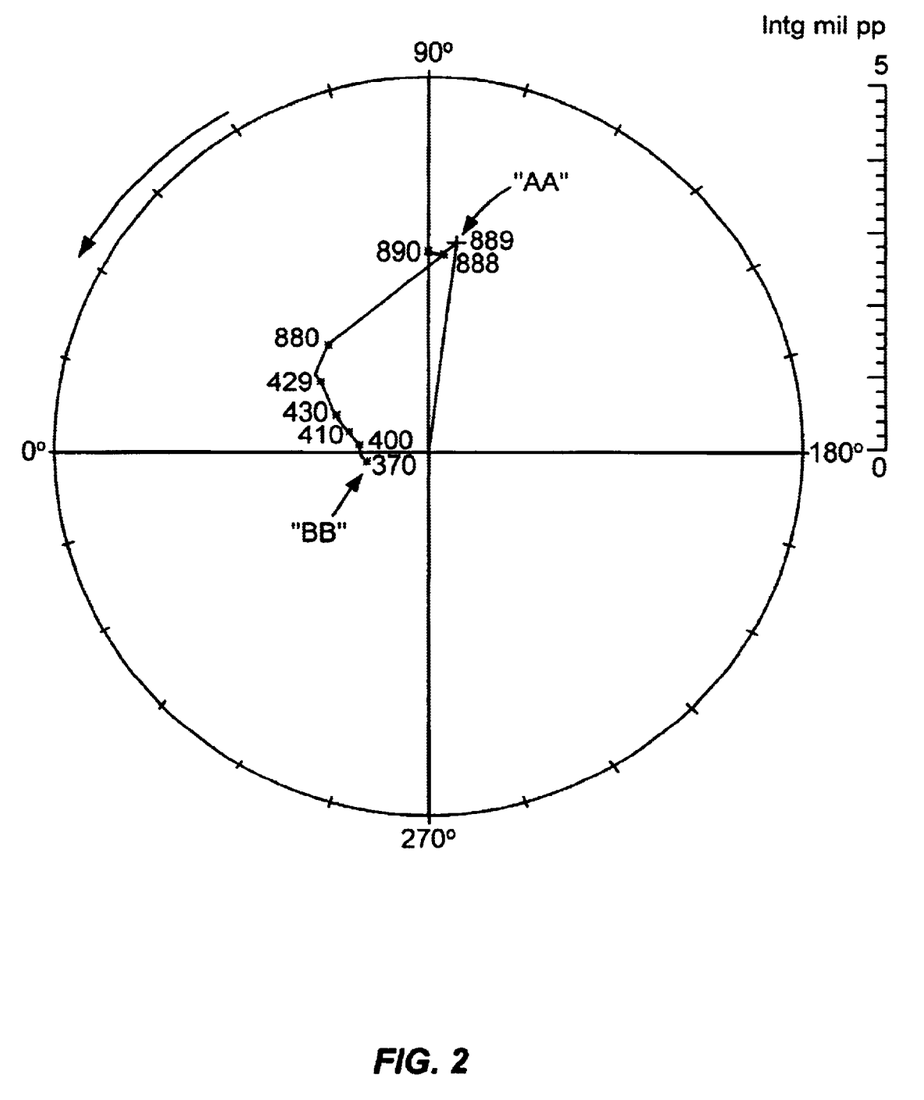
FIG. 2 is polar graph of a vibration data from a velocity transducer oriented at 90 degrees from the keyphasor from a three-shaft scroll pump before the application of resonance balancing.

Another purpose of performing a vibration analysis is to obtain an understanding of the rotor dynamics of a machine before any balancing is attempted. A machine's rotor-dynamics are generally characterized in view of the machine's or rotating shaft's natural frequency, to determine where the machine operates in relation to resonant conditions. It is generally known that when a vibration force occurs at a natural frequency, the structure will resonate (i.e., respond with a large amplitude vibration). Natural frequencies relate to machinery vibration in several important areas: (1) resonance of machine structure can cause changes in vibration levels with rpm, and these changes can be drastic as the structure move into and out of resonance and (2) the dynamics of rotating shafts change significantly near natural frequencies. Further, shafts which operate above or near the natural frequency of the shaft are classified as flexible, while those that operate well below their natural frequency are classified as rigid shafts. As the name implies, a flexible rotor is one which bends during operation. This bending occurs at the natural frequency of the rotor, often referred to as a critical speed. A flexible rotor has several critical speeds, each with a specific bending shape or direction. The distinction between rigid and flexible rotors is important because the dynamics of a rotor change significantly as it approaches and passes through a critical speed. For example, an output of a vibration analysis is provided in FIGS. 1 and 2. FIGS. 1 and 2 are polar graphs of a vibration data from a velocity transducer oriented at the keyphasor and at 90 degrees from the keyphasor respectively, from a three-shaft scroll pump before the application of resonance balancing. These figures show that the location of the maximum vibration amplitude shifts by 90 degrees as the shaft speed changes from its 1X speed down to a speed lower than the 1X speed, indicating that the shaft is a flexile shaft or that the shaft is operating at a resonant condition. Phase readings are quite useful in recognizing resonance and in differentiating resonance from rotationally related components. For example, if the vibration is rotationally related (e.g., a key way passing frequency), the phase relative to the keyphasor signal will be constant. On the other hand, if the vibration is resonance-related, the phase will not be constant, and as is shown on FIG. 1, the phase corresponding to the location of the maximum vibration amplitude changes from approximately zero degrees at 900 rpm (at "A") to 270° at 370 rpm (at "B"), providing an indication that the machine and hence the vibration is resonance-related. Similar results are provided by FIG. 2, where the phase corresponding to the location of the maximum vibration amplitude changes from approximately 90° at approximately 890 rpm (at "AA") to approximately 0° at 370 rpm (at "BB").

Furthermore, as can be seen from FIG. 1, the vibration amplitude drops significantly from approximately 2.6 mils (at "A") to approximately 0.2 mils (at "B") as the rotational speed drops from 889 rpm to 370, providing another indication that the machine is operating at resonance. Similar results are provided by FIG. 2, where the vibration amplitude drops significantly from approximately 3 mils (at "AA") to approximately 0 mils (at "BB") as the rotational speed drops from 889 to 370 rpm.

Using vibration analysis, to obtain an understanding of the rotor dynamics of the machine, the Rotor Influence Coefficient (RIC) of the machine operating at or near resonance can then be determined.

Rotor Influence Coefficient

The RIC test provides for a one-run balancing process, such that after a first balancing, future balancing on that machine or other machines which are rotationally, mechanically and vibrationally similar, can usually be done with only one step to add (or remove) weights at the appropriate correction planes. The data from the RIC test will yield a "phase lag (or lead)" and sensitivity (or influence coefficient) which enables determination of the required weight and location directly from the initial operating vibration (amplitude and phase) readings. Machine similarity also assumes that the "system" as in the combination of the machine, bearings, mounts, foundation, piping, process conditions, etc. are not significantly different between the two balance efforts.

The RIC method generally requires that a trial vibration analysis be first performed to record both amplitude and phase angle of the vibration for each measurement plane. A measurement plane is a location (e.g., on a shaft) where vibration transducers acquire data for balancing purposes. Weights are later applied to balance a plane or planes to correct the unbalance condition. The trial weights are added to a first correction plane, the rotor is spun and the vibration amplitude and phase angle is recorded at each measurement plane. Next, the trail weight is removed from the first correction plane and placed on the next correction plan, the rotor spun and vibration amplitude and phase angle are recorded at each measurement plane. By moving the trial weight and repeating this process for all measurement planes, it becomes possible to solve for (a set of) the influence coefficients. Trial weights are used to measure how the rotor will respond to the weight. This weight will induce a different balance condition with an accompanying change in the vibration level and/or phase lag. This change, once introduced into balance calculations, will dictate how much and where a weight correction will be required to reduce a vibration to an acceptable level.

The industry practice guidelines related to the balancing of rotating machinery specifically state that a balancing and hence influence coefficient tests not be done near resonance conditions as the phase and amplitudes change very rapidly with speed near resonance due to the non-linear response inherent with resonance.

Application of the Method for Balancing a Three-Shaft Pump Operating at Resonance A particular type of rotating machinery which was balanced using the method of the present invention was a Normetex 600 m$^3$/hr three-shaft scroll pump, This particular pump is chosen to illustrate the utility of the embodiments of the present invention as applied to a three-shaft pump and especially a three-shaft pump, which operates at a resonance condition at its normal (1X) operational speed. The combination of the multiple shafts, multiple correction planes and the resonance condition at 1X speed are such unique conditions that to the inventors knowledge, no pumps with these conditions have been successfully balanced using a RIC method. The multiple rotors present additional challenges to obtaining an understanding of the machine dynamics of the three-shaft scroll pump, thus making any balancing effort more challenging. Further, the resonant condition at the 1X speed, is another condition that prevents many from even attempting to balance such a machine. As provided above, the accepted industry practice is to not balance a machine operating in or near a resonant condition for several reasons, some of which were set forth above. This aspect (resonance) makes the method of balancing as embodied by this invention unique to the industry.

In general, scroll pumps are very common and are used in almost all the refrigeration systems to draw a vacuum. The difference between the common scroll pump and the scroll pump as tested herein is that common scroll pumps have a single rotor. While the ability to balance single shaft scroll pumps has existed in the past, the uniqueness of three-shaft scroll pumps has created a unique need for a balancing approach. This unique need is addressed by the inventor herein and the invented methodology is applied to balance such a pump, as is described below. The Normetex 600 $m^3$/hr scroll pump is comprised of a stationary scroll above which rotates the rotating scroll mounted on the three shafts (or arbors). The ends of the shafts are mounted in a large machine frame parallel to each other and located 120 degrees apart. Two shafts have drive motors while the remaining shaft is not driven. All three shafts have two counter weights, which are used the balance planes.

The method used to balance the Normetex pump is generally the RIC method with the very significant exception that the machine operates in a structural resonance condition, and hence all balancing work is performed at the resonant speed. This is necessary since the machine operates continually in resonance, a design that is also contrary to industry practice. Due to the added risk to the machine and operator, extreme care was taken in sizing the trial and correction weights. Extreme Care was most necessary during the trial weight stage and was exercised by starting with a very small weight being added to determine what was safe and incrementally increasing the size of the weight. Each weight change to the arbors/shafts required disassembly, weight addition, re-assembly, preparation for startup, collecting startup, steady state and coast down vibration data and finally analyzing the results. Each evolution described required roughly 15 man-hours. For example, during the development of the Rotor Influence Coefficient and balancing of the first pump seven different weight sizes were used requiring 42 individual weights being added and removed in a systematically manner. Since influence factors can change drastically as the machine moves into or out of resonance (during the testing) unexpected test data may be obtained. Expected data represents a commensurate change in the vibration amplitude and/or phase angle and the relationship of the vibration data points. Unexpected results would be indicated by non-linear results like a large or unacceptable change in the vibration condition with only a slight change in weight amount or placement. The operation and balancing of the pump at or near its resonant condition creates uniqueness to the balancing process, which adds significant time to process of determining a correct influence coefficient. As stated above 42 different weights were added and removed during the development of the RIC in an effort to prevent machine damage. The unbalance results were compared to differentiate the linear verses non-linear changes to balance condition as well as the analysis of the internal verses external motion. Analysis of three shafts with six balance weights and one moving scroll operating at a steady speed synchronous with a natural frequency has, to the knowledge of the inventor, never been performed in the United States. This combined complexity and the prohibitions based on industry practice (to not balance a machine operating at or near resonance) has most likely prevented others from attempting or succeeding to date.

Figure 3:
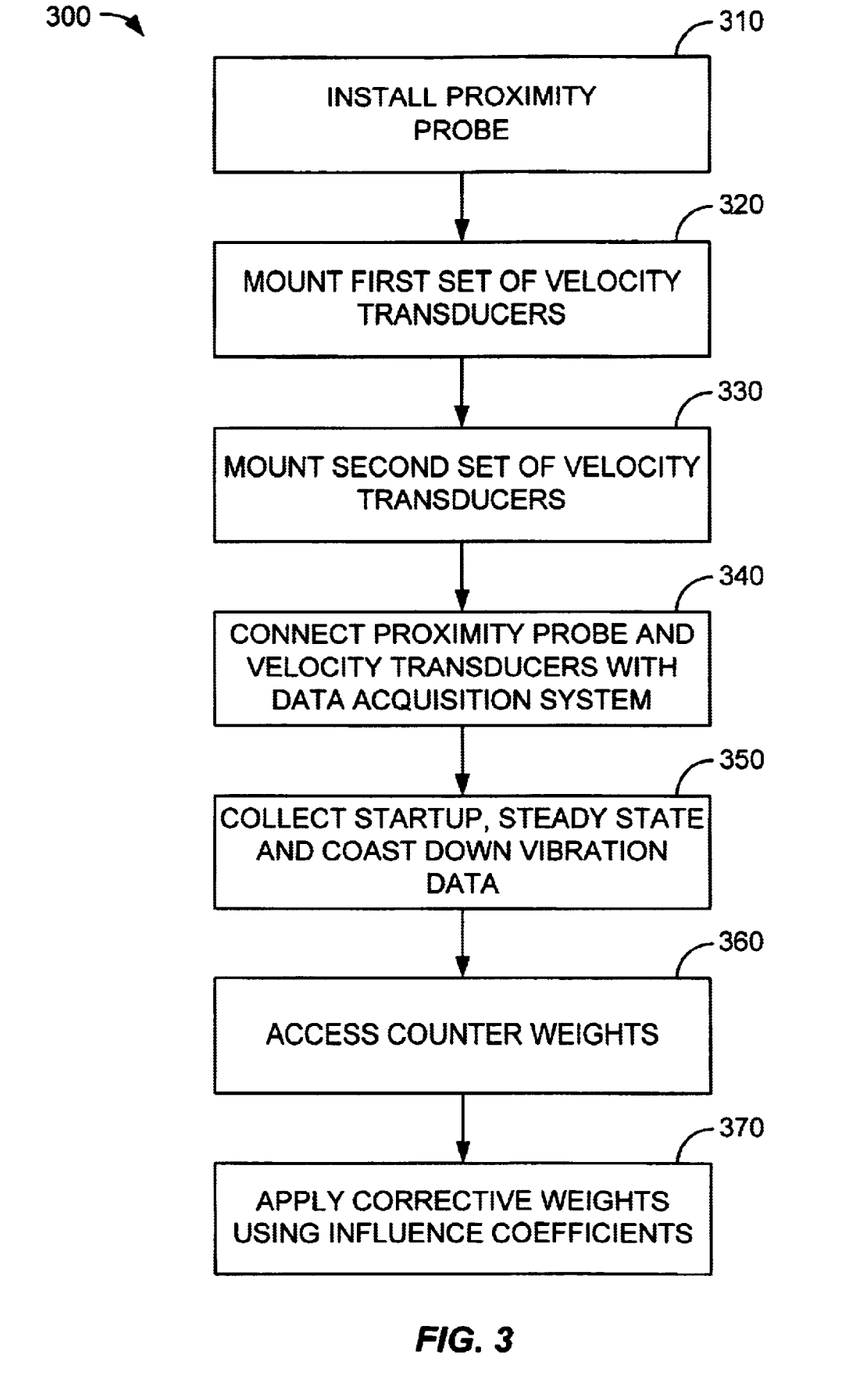
FIG. 3 is a flowchart of an embodiment of the vibration analysis method of the present invention.

FIG. 3 is a flow chart 300 of the overall process used to balance pumps operating at resonance conditions. The method as described by FIG. 3 is applied to a Normetex 600 $m^3$/hr three shaft scroll pump. The Normetex pumps tested were not designed to have internal vibration monitoring or speed measurements. Since resonance balancing requires internal vibration measurements and thus the means to install the necessary sensors, the pumps tested were temporarily modified to accept vibration transducers and a tachometer during the balancing process.

Figure 4A:
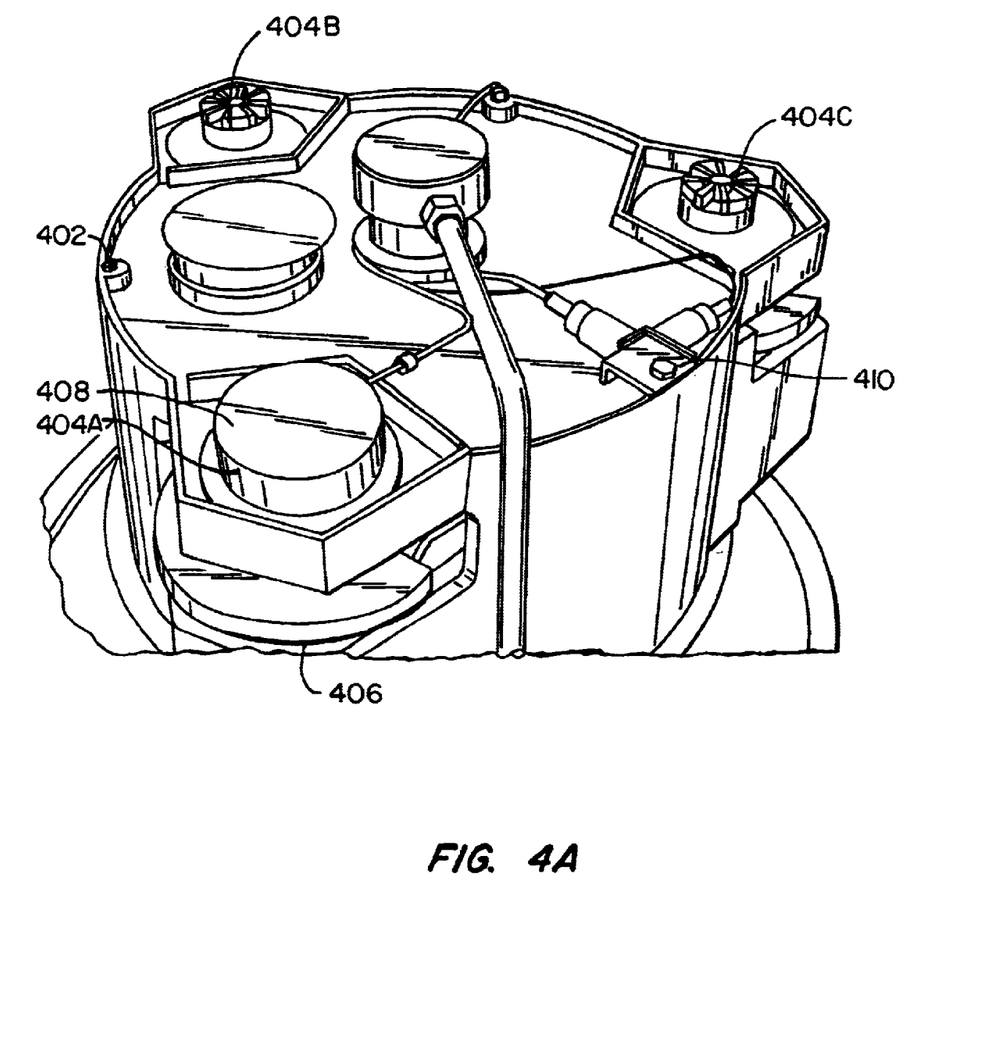
FIG. 4A shows a top internal view of a multi rotor pump being configured for balancing using an embodiment of the method and system of present invention.
Figure 4B:
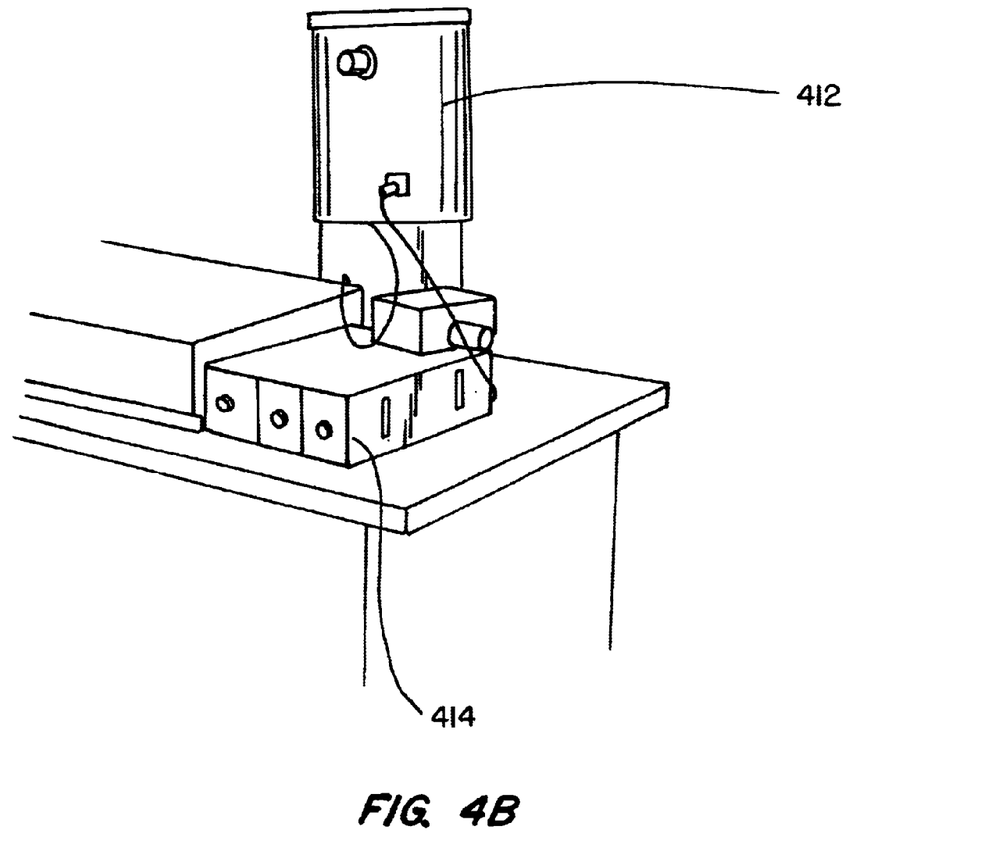
FIG. 4B shows an external view of the multi rotor pump of FIG. 4A showing the outer casing, as well as the data acquisition system.

FIG. 4A shows a top internal view of a multi rotor (e.g., Normetex) pump being configured for balancing using an embodiment of the method and system of present invention. FIG. 4A shows the internal frame 402, three shafts 404A–C, each shafts having two counterweights 406 attached near its ends (one of three shown). A proximity probe 408 is mounted on one shaft to provide key phasor or rotational velocity readings. A pair of vibration transducers 410 are mounted at 90° readings with respect to one-another and provide vibration data. FIG. 4B shows an external view of the multi rotor pump of FIG. 4A showing the outer casing 412, as well as the data acquisition system 414.

The first step of the balancing process is the installation of a proximity probe for phase readings (step 310). In installing the proximity sensor, it is preferred to have zero degrees be at the leading edge of the counterweights. Next, a first set of velocity transducers are mounted on the pump inner frame using a frame adapter (step 320). Preferably, the first set of velocity transducers includes two (or more) velocity transducers, which provide their output to channels 1 and 2 of a data acquisition system, wherein the channel 1 transducer is oriented in the same direction as the key phasor, and wherein the channel 2 transducer is located at 90 degrees in the direction of rotation from the channel 1 transducer. Next, a second set of velocity transducers are mounted on the outer casing of the pump (step 330). Preferably, the second set of velocity transducers includes two (or more) transducers, which provide their output to channels 3 and 4 of a data acquisition system, wherein the channel 3 transducer is mounted in the same direction as the channel 1 transducer, and wherein the channel 4 transducer is mounted in the same direction as the channel 2 transducer. Next, all the channels from all the measurements instruments are connected to a data acquisition system (step 340). In an embodiment, the channels corresponds to channels 1–4 for the four velocity transducers and channel 5 for phase readings. Thus, the method and system in according to the present invention enable the balancing of a rotating machinery having six correction planes by only taking vibration data from 4 planes, yet applying correction weights to six planes.

In one embodiment, Bentley Nevada velocity transducers were installed inside the pump on a fabricated bracket, which was then bolted to the inner frame which supports the entire scroll pump. Another set of velocity transducers were magnetically mounted on the outside of the pump casing in the same plane as the internal channels. Further, a Bentley Nevada 3300 displacement probe was used to collect speed and vibration phase angles. This probe is also mounted on a fabricated bracket. An important factor is the proper selection and placement of appropriate transducers. The method of the present invention uses a proximity probe and a plurality of velocity transducers as described above. The use of this particular combination is for illustration purposes and is not meant to limit the scope of the present claimed invention. All the transducers' outputs were connected to a Bentley Nevada ADRE 208P data collection and analysis system. The data analysis was performed in the time domain. Alternately, the data analysis can be carried out in the frequency domain.

With the instrumentation in place, vibration data was collected next pal (step 350). Vibration data was collected for steady state operation at the running speed, as well as for start up and coast down conditions. The data collected provided an assessment of the machine dynamics as well as the magnitude of the measured vibration. For example, Table 1 below shows the before and after balancing vibration results. As can be seen from this table, 1X vibration values for channels 1–4 are 2.7, 2.9, 4.25, and 4.02 mils. These vibration values all exceed acceptable levels, (e.g., the qualitative criterion provided by the manufacturer is that a French franc placed on the outer frame flange must stand on edge without falling over). To reduce these vibration levels, correction weights had to be applied to the existing counterweights. The outer pump casing was removed next (step 360) to provide access to the rotor counterweights. Next, using a previously determined influence coefficient, the correction weights were applied to the counterweights. When the indicated vibration is in alignment with the counterweights then the correction weight amount needs to removed from the counter weights, and if the indicated vibration is in not in alignment then the correction weight is added to the counter weights, wherein alignment means phase relationship between the vibration and counterweight center. In one embodiment, the correction weights are placed on both the upper and lower counterweights at a ratio of approximately 60% of the total correction weight on the top counter weight and the remaining approximately 40% weight on the lower counter weight. The approximately 60%/40% split was determined and refined by the trial weight testing process and is part of the RIC-based method.

For example, the previously determined influence coefficient is 210 grams per mil with a 10-degree advance. Thus, for a 1X vibration of 4 mils, as measured on the frame (e.g., channel 4), the correction weights would be 840 grams (4 mils×210 grams per mil) per rotor with 504 grams on the top counterweights and 336 grams on the lower counterweights. Furthermore, using the 10 degree advance angle of the influence coefficient, the corrections weights were placed 190 degrees in the direction of rotation from the indicated vibration. The addition of balance correction weight must be equal to and opposite of the heavy spot of the rotor, hence 180 degrees. The actual mechanical lag of the rotor was found to 10 degrees once the non-linear resonance effects on phase angle were understood, thus resulting in the placement at 190 degrees. Furthermore, alignment of indicated vibration and counterweights is a phase relationship measured in units of degrees. For example with 0 degrees being located at the edge of a shaft/arbor counterweight, a vibration of 270 degrees would be 180 degrees from the center of the counterweight, understanding that a counter weight is a half circle, i.e., 180 degrees in circumferential length.

Table 1 below shows the vibration data comparing the vibration levels from after the balancing to levels before balancing. As can be seen from this table, the vibration levels after the balancing are significantly lower than those before the balancing.

TABLE 1

Before and After Balancing Running Speed Vibration Values

| Channel | Vibration-Before (mils) | Vibration-After (mils) | % Reduction |
|---|---|---|---|
| 1-inside | 2.7 | 0.24 | 91 |
| 2-inside | 2.9 | 0.07 | 98 |
| 3-outside | 4.25 | 0.49 | 88 |
| 4-outside | 4.02 | 0.7 | 83 |

The resonance balancing method of the present invention provides several advantages. One advantage is in the difference between the number of correction planes vs. the number of measurements. While correction weights were applied to 6 locations, vibration data was only obtained from four velocity transducers as set forth above. This is possible once the rotor dynamics were better understood. Specifically that, although each shaft/arbor has it's own imbalance with two planes for correction, the resultant unbalance can be controlled as if there was only one shaft.

As will be understood by those of skill in the art, the present invention may be embodied in other specific forms without departing from the essential characteristics thereof. For example, the resonance balancing system and method of the present invention may be carried out using other types of vibration transducers. Further, the resonance balancing system and method of the present invention are applicable to the balancing of any other machine that operates at or near resonance conditions. Accordingly, the foregoing description is intended to be illustrative, but not limiting, of the scope of the invention which is set forth in the following claims.

What is claimed is:

1. A method of balancing a rotating machinery having multiple non-coaxial shafts, each shaft having two correction planes, the rotating machinery having an inner frame, an outer casing, and counterweights connected with a shaft of the rotating machinery, said method comprising:

mounting a proximity probe on the outer casing, the proximity probe configured to provide phase readings to a phase reading output channel, wherein the phase reading is measured in degrees measured with respect to a key phasor;

mounting a first plurality of velocity transducers on the inner frame, each of the velocity transducers configured to provide a first plurality of velocity signals to a first plurality of velocity signal output channels;

mounting a second plurality of velocity transducers on the outer casing, each of the velocity transducers configured to provide a second plurality of velocity signals to a second plurality of velocity signal output channels;

connecting the phase reading output channel, the first and second plurality of velocity signal output channels to a data acquisition system;

collecting vibration data for a number of data channels, corresponding to measurement planes, that are less than the number of correction planes, provided by the phase reading output channel, and the first and second plurality of velocity signal channels, using the data acquisition system;

removing the outer casing to allow access to the counterweights; and adjusting the counterweights using a predetermined rotor influence coefficient to reduce said vibration below an acceptable threshold level.

2. The method of claim 1 wherein the rotating machinery is a three-shaft scroll pump.

3. The method of claim 1 wherein said mounting the proximity probe includes connecting the proximity probe to the outer casing.

4. The method of claim 1 wherein the first plurality of velocity transducers comprises two velocity transducers which are installed 90 degrees from each other, in order to provide velocity data in two planes, and wherein one of the at least two velocity transducers is oriented in the direction of the key phasor.

5. The method of claim 1 wherein the second plurality of velocity transducers comprises two velocity transducers which are installed 90 degrees from each other, in order to provide velocity data in two planes, and wherein one of the at least two velocity transducers is oriented in the direction of the key phasor.

6. The method of claim 1 wherein said collecting said vibration data comprises collecting amplitude, velocity, and phase angle data, wherein the phase angle is measured in degrees from said key phasor.

7. The method of claim 1 wherein said collecting said vibration data comprises collecting amplitude, velocity, and phase angle data, for start up, steady state and coast down operating conditions, and wherein the rotating machinery is operating near a resonant condition during said steady state operating condition.

8. The method of claim 1 wherein the shaft is one of three shafts and wherein said counterweights comprise upper and a lower counterweights, wherein each of said shafts is connected with an upper counterweight and a lower counterweight, and wherein said upper and lower counterweights are mounted near the ends of each of said shafts.

9. The method of claim 1 wherein said adjusting the counterweights includes adding correction weights to and removing correction weights from the counterweights.

10. The method of claim 1 wherein said adjusting the counterweights includes adding correction weights to and removing correction weights from the counterweights, and wherein said adjusting primarily comprises said removing when an indicated vibration is in alignment with said counterweights, and wherein said adjusting primarily comprises said adding when an indicated vibration is not in alignment with the counterweights.

11. The method of claim 1 wherein the predetermined rotor influence coefficient is obtained from an equivalent rotating machinery, and wherein an equivalent rotating machinery is a rotating machinery operating substantially at resonance.

12. The method of claim 1 wherein the rotor influence coefficient provides a measure for said adjusting the counterweights, and wherein the measure is a weight adjustment per a vibration displacement and a weight placement angle value measured with respect to the location of the maximum vibration displacement.

13. A system for balancing a rotating machinery having multiple shafts that are not coaxial and each shaft having two correction planes, the rotating machinery having an inner frame, an outer casing, and counterweights connected with a shaft of said rotating machinery, said system comprising:

a proximity probe configured to be mounted on the outer casing of the rotating machinery, said proximity probe configured to provide phase readings to a phase reading output channel, wherein said phase reading is measured in degrees measured with respect to a key phasor, located on one of said shafts;

a first plurality of velocity transducers configured to be mounted on the inner frame of the rotating machinery, each of said velocity transducers configured to provide a first plurality of velocity signals to a first plurality of velocity signal output channels;

a second plurality of velocity transducers configured to be mounted on the outer casing of the rotating machinery, each of said velocity transducers configured to provide a second plurality of velocity signals to a second plurality of velocity signal output channels;

a data acquisition system for receiving said phase reading output channel, said first and second plurality of velocity signal output channels, wherein the number of data channels corresponding to measurement planes is less than the number of corrections planes; and counterweights configured to be applied to the shaft of the rotating machinery using a predetermined rotor influence coefficient.

14. The system of claim 13 wherein the rotating machinery is a three-shaft scroll pump.

15. The system of claim 13 wherein said first plurality of velocity transducers comprises at least two velocity transducers which are installed 90 degrees from each other, in order to provide velocity data in two planes, and wherein one of said at least two velocity transducers is oriented in the direction of the key phasor.

16. The system of claim 13 wherein said second plurality of velocity transducers comprises at least two velocity transducers which are installed 90 degrees from each other, in order to provide velocity data in two planes, and wherein one of said at least two velocity transducers is oriented in the direction of the key phasor.

17. The system of claim 13 wherein said data acquisition system is configured to collect vibration data comprising amplitude, velocity, and phase angle data, for start up, steady state and coast down operating conditions, and wherein said rotating machinery is operating near a resonant condition during the steady state operating condition.

18. The system of claim 13 wherein the shaft is one of three shafts and wherein said counterweights comprise upper and a lower counterweights, wherein each of the shafts is connected with an upper counterweight and a lower counterweight, and wherein said upper and lower counterweights are mounted near the ends of each of the shafts.

19. The system of claim 13 wherein said counterweights include correction weights for adding and for removing correction weights from said counterweights, and wherein said counterweights are removed when an indicated vibration is in alignment with said counterweights, and wherein counterweights are added when an indicated vibration is not alignment with said counterweights.

20. The system of claim 13 wherein the predetermined rotor influence coefficient is obtained from an equivalent rotating machinery, and wherein an equivalent rotating machinery is a rotating machinery operating substantially at resonance.

21. The system of claim 13 wherein the rotor influence coefficient provides a measure for adjusting said counterweights, and wherein the measure is a weight adjustment per a vibration displacement and a weight placement angle value measured with respect to the location of the maximum vibration displacement.

* * * * *